(12) United States Patent
Iffland

(10) Patent No.: US 7,573,825 B2
(45) Date of Patent: Aug. 11, 2009

(54) METHODS, APPARATUS AND COMPUTER PROGRAM PRODUCTS FOR TESTING A VOICE OVER INTERNET PROTOCOL COMMUNICATION SYSTEM

(75) Inventor: Frederick Iffland, Dunwoody, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 1276 days.

(21) Appl. No.: 10/858,922

(22) Filed: Jun. 2, 2004

(65) Prior Publication Data

US 2005/0271029 A1 Dec. 8, 2005

(51) Int. Cl.
  *H04L 12/26* (2006.01)
  *H04M 1/24* (2006.01)
  *H04M 3/22* (2006.01)

(52) U.S. Cl. .............. 370/241; 370/242; 370/248; 370/250; 379/1.01; 379/1.03; 379/14; 379/10.02; 379/16; 379/27.02; 379/27.03; 379/27.04

(58) Field of Classification Search .......... 370/241, 370/242, 244, 247, 250, 252, 352, 401, 466, 370/467, 248; 379/1.01, 1.03, 9, 14, 14.01, 379/10.01, 10.02, 11, 12, 15.01, 15.02, 15.03, 379/16, 18, 21, 22, 26.01, 27.01–27.04, 28, 379/29.01, 32.01, 32.02

See application file for complete search history.

(56) References Cited

U.S. PATENT DOCUMENTS

| | | | | |
|---|---|---|---|---|
| 3,840,712 A | * | 10/1974 | Oberer et al. | 379/11 |
| 5,359,646 A | * | 10/1994 | Johnson et al. | 379/27.02 |
| 5,555,295 A | * | 9/1996 | Bhusri | 379/112.09 |
| 5,809,108 A | * | 9/1998 | Thompson et al. | 379/10.02 |
| 6,950,498 B1 | * | 9/2005 | McMullin et al. | 379/29.01 |
| 7,388,946 B1 | * | 6/2008 | Mussman et al. | 379/15.01 |
| 2002/0167937 A1 | * | 11/2002 | Goodman | 370/352 |

* cited by examiner

*Primary Examiner*—Harry S Hong
(74) *Attorney, Agent, or Firm*—Myers Bigel Sibley & Sajovec, P.A.

(57) ABSTRACT

Methods, apparatus, and computer program products are provided for testing a Voice Over Internet Protocol (VoIP) communication system. A VoIP test phone call is generated through an Internet communication link to a VoIP service provider for a called telephone number. Success of the VoIP test phone call is determined. The success of the VoIP test phone call may be determined based on whether it is established with communication equipment at the called telephone number within a threshold time, based on whether it is established within a threshold number of attempts, and/or based on a measured quality of service in the VoIP test phone call when it is established. Further VoIP test phone calls to test the VoIP communication system can be scheduled.

23 Claims, 3 Drawing Sheets

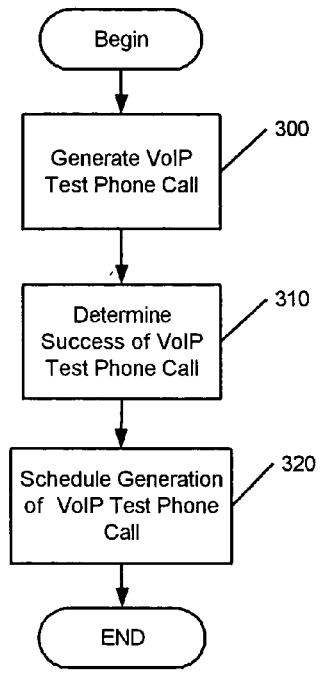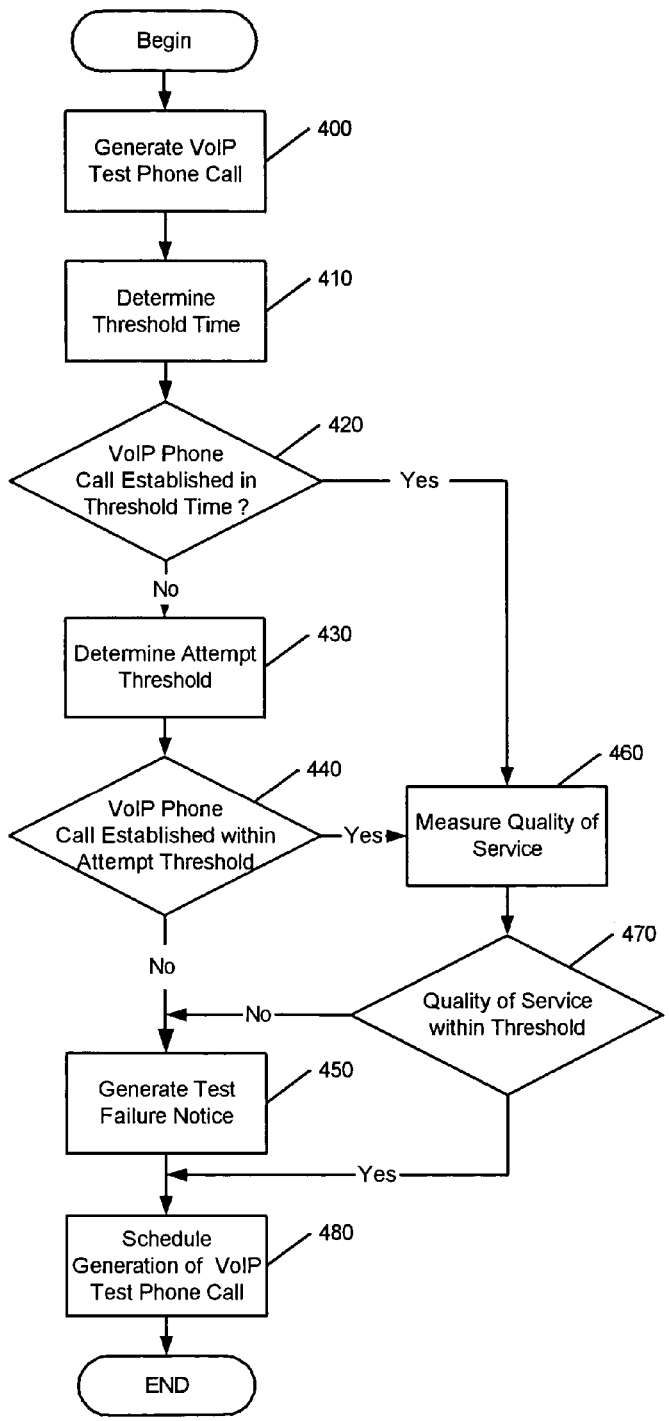

METHODS, APPARATUS AND COMPUTER PROGRAM PRODUCTS FOR TESTING A VOICE OVER INTERNET PROTOCOL COMMUNICATION SYSTEM

FIELD OF THE INVENTION

The present invention generally relates to the field of telephony, and more particularly to apparatus, methods, and computer program products for testing Voice Over Internet Protocol communication systems.

BACKGROUND OF THE INVENTION

The Internet has become a mainstream network for communicating not just data, such as email and pictures, but also for providing real-time bi-directional voice communications. Voice Over Internet Protocol (VoIP) is an industry standard that has evolved to enable users to place phone calls through the Internet, instead of through the Public Switched Telephone Network (PSTN). A conventional phone or other Consumer Premises Equipment (CPE) may now be connected to the Internet using an interface device that converts analog phone signals to digital signals that can be communicated through the Internet. A phone call may thereby be communicated through the Internet to a VoIP provider, who converts the call back to an analog signal and places the call through the PSTN that is local to the called phone. A user can thereby dial a telephone number in a conventional manner and have the call routed through the Internet, instead of through the PSTN.

The availability of the PSTN for a user may be tested by determining whether a dial tone is received from the PSTN. However, in a VoIP system the dial tone can be generated by the CPE itself or by an interface device that connects the CPE to the VoIP system. Accordingly, a VoIP system may need to be tested differently than the PSTN system.

SUMMARY OF THE INVENTION

Various embodiments of the present invention provide methods, apparatus, and computer program products for testing a VoIP communication system. A VoIP test phone call is generated through an Internet communication link to a VoIP service provider for a called telephone number. Success of the VoIP test phone call is determined. In some embodiments of the present invention, the success of the call may be determined based on whether it is established with communication equipment at the called telephone number within a threshold time, based on whether it is established within a threshold number of attempts, and/or based on a measured quality of service when the call is established. A notice may be generated that indicates a result of the determination of success of the call.

In some further embodiments of the present invention, the time of day and/or day of week when the call is generated may be used to determine the threshold time and/or threshold number of attempts that are allowed before the call is determined to have failed. The quality of service of an established VoIP test phone call may be determined based on a time delay in communication with the called communication equipment and/or based on quality of communication signal from the called communication equipment. The VoIP test phone calls may be scheduled at a periodic rate, based on the time of day and/or day of week, and/or based on the determined success of one or more previous VoIP test phone calls.

Accordingly, a VoIP communication system can be tested using a VoIP test phone call that is communicated to a VoIP service provider. By determining the success of the phone call, the health and associated operational state of the VoIP communication system can be determined. For example, the phone call may test the collective ability of the components in the VoIP communication system to establish an end-to-end connection between the originating VoIP test apparatus and a called communication device, and/or it may test the quality of the connection if it is the connection is established. Although a VoIP communication system may have an ability to test its individual components, the VoIP test phone call may serve as an independent overall test of the VoIP communication system and may be uniquely able to test the end-to-end call processing health of the system. Such independent testing may include having the VoIP test apparatus be separate from and/or controlled independently of the VoIP communication system that is tested.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which:

FIG. 3 is a flow chart illustrating operations for testing a VoIP communication system according to various embodiments of the present invention; and FIG. 4 is another flow chart illustrating operations for testing a VoIP communication system according to various further embodiments of the present invention.

DETAILED DESCRIPTION OF THE INVENTION

Figure 1:
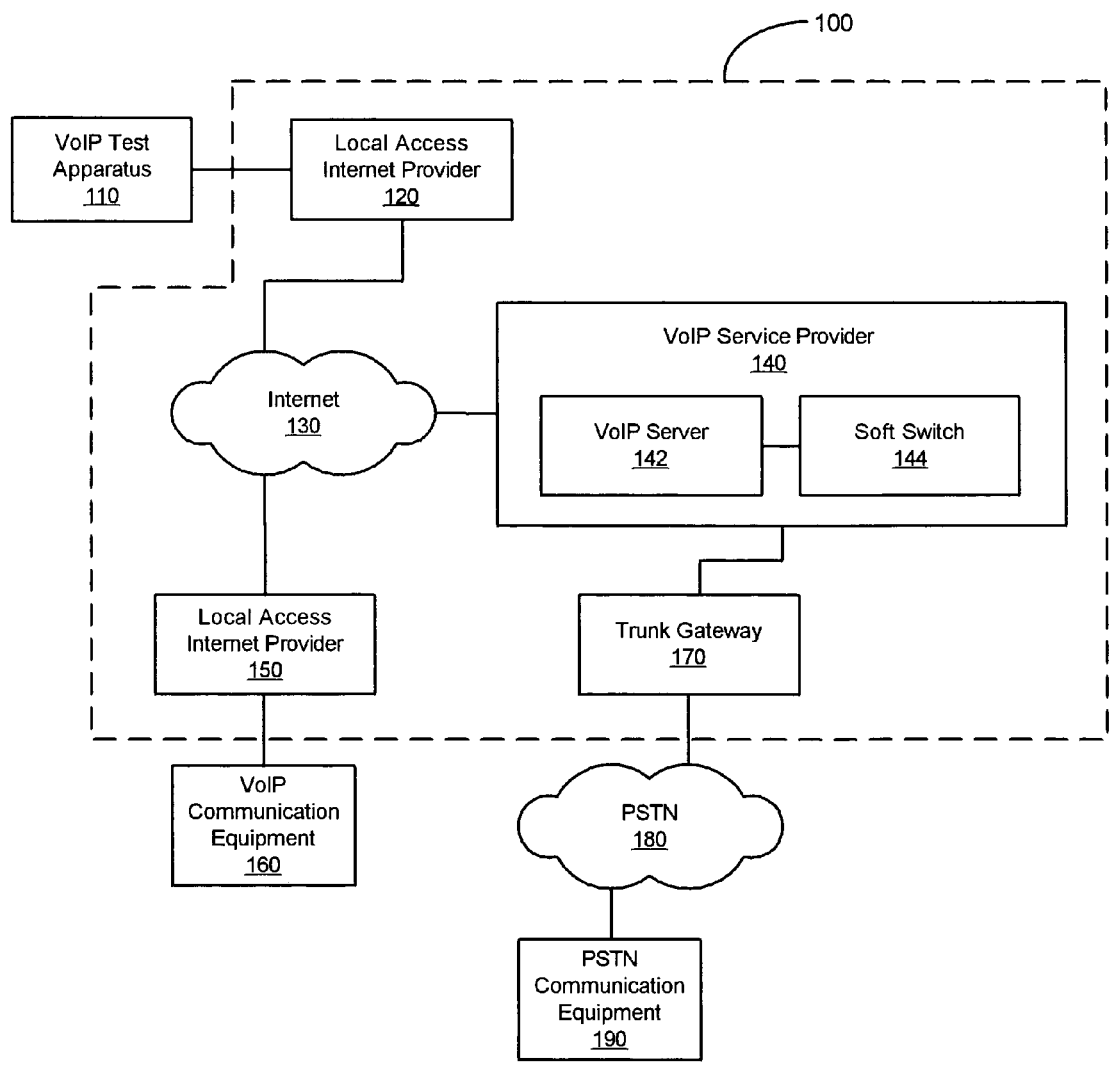
FIG. 1 is a block diagram of a Voice Over Internet Protocol (VoIP) communication system that is tested by a VoIP test apparatus 110, and that communicates with PSTN communication equipment via a Public Switched Telephone Network (PSTN) according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

Like numbers refer to like elements throughout the description. It will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, apparatus, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 is a block diagram of a Voice Over Internet Protocol (VoIP) communication system 100 that may be tested by a VoIP test apparatus 110 according to various embodiments of the present invention. The exemplary VoIP communication system 100 can communicate with PSTN communication equipment 190 via a Public Switched Telephone Network (PSTN) 180 and/or can communicate with VoIP communication equipment 160. The VoIP communication system 100 enables phone calls to be initiated and/or received by the VoIP test apparatus 110, the VoIP communication equipment 160, and/or the PSTN communication equipment 190 via the Internet 130, and such phone calls are referred to as VoIP phone calls. It is to be understood that the Internet 130 referred to herein may be any packet switched data network.

The VoIP communication system 100 may include local access internet providers 120 and 150 that respectively connect the VoIP test apparatus 110 and the VoIP communication equipment 160 with the Internet 130. The VoIP communication system 100 also includes a VoIP service provider 140 that is connected to the Internet 130 and is connected to the PSTN 180 via a trunk gateway 170. The local access Internet providers 120 and/or 150 may be, for example, a local telephone company that provides access to the Internet 130 through a dial-up connection and/or through a digital subscriber line (DSL), a cable TV/communications company that provides a cable modem connection to the Internet 130, and/or a wireless operator that provides cellular data communications to the Internet 130 over a wireless interface.

The VoIP communication equipment 160 may be a computer with a microphone, speaker, and software that is configured to convert voice to/from a digital format that can be routed through the Internet 130. Alternatively, the VoIP communication equipment 160 may be a conventional telephone that is connected through a VoIP interface device that is configured to convert voice to/from a digital format that can be routed through the Internet 130.

A subscriber may setup VoIP services by registering with the VoIP service provider 140 and being assigned one or more VoIP telephone numbers. The VoIP service provider 140 can then route phone calls from/to the VoIP telephone number(s) assigned to the subscriber based on a called telephone number (i.e., the telephone number to which the phone call is directed). For example, the VoIP service provider 140 may route and establish a phone call from the VoIP communication equipment 160 and/or the VoIP test apparatus 110 through the respective local access internet provider 150 and 120 and the Internet 130, and through the trunk gateway 170 and the PSTN 180 to the PSTN communication equipment 190. The PSTN communication equipment 190 may be a conventional plain old telephone system (POTS) telephone.

The VoIP service provider 140 can include a VoIP feature server 142 and a soft switch 144. The VoIP feature server 142 may be, for example, BroadWorks platform by Broadsoft, and can include subscriber information used for routing calls to/from subscribers. The soft switch 144 may be, for example, a Siemens hiQ 8000 Softswitch, and can provide a bridge between the Internet 130 and the trunk gateway 170 and/or equipment in the PSTN 180. The VoIP feature server 142 and/or the soft switch 144 may perform one or more of the operations for routing and establishing VoIP phone calls.

The VoIP test apparatus 110 tests the VoIP communication system 100 by generating VoIP test phone calls through an Internet communication link in the VoIP communication system 100 and determining their success. In some embodiments of the present invention, the VoIP test apparatus 110 generates a VoIP test phone call to a called telephone number. The VoIP test phone call can be communicated through the local access internet provider 120 and the Internet 130 to the VoIP service provider 140. The VoIP service provider 140 can route the VoIP test phone call based on the called telephone number, which may be, for example, routed to the VoIP communication equipment 160 and/or the PSTN communication equipment 190. The VoIP test apparatus 110 also determines the success of the VoIP test phone call.

For example, the VoIP test phone call may be lost, corrupted, and/or delayed more than a threshold time by the local access internet provider 120, the Internet 130, the VoIP service provider 140, and/or other communication equipment needed to establish the phone call, such as the local access Internet provider 150, the trunk gateway 170 and/or the PSTN 180. The VoIP service provider 140 may not establish the phone call due to, for example, a partial/complete failure and/or overload of the VoIP feature server 142 and/or the soft switch 144 and/or the underlying routers in the Internet network 130.

The VoIP test apparatus 110 may determine the success of the VoIP test phone call by determining whether the VoIP test phone call is established with the called communication equipment within a threshold time. A VoIP test phone call may be determined to have failed when it cannot be established with the called communication equipment within the threshold time. The failure threshold time may be determined based on what time of day and/or day of week the VoIP test phone call is generated. Accordingly, the threshold time may be varied based on an expected loading of the VoIP communication system 100. During high loading of the VoIP communication system 100, the threshold time may be increased to allow for more time to establish a phone call before a failure is determined, and during low loading of the threshold time may be decreased. Varying the threshold time in this manner may allow the VoIP test apparatus 110 to more accurately determine the success of a VoIP test phone call and, thereby, the health of the VoIP communication system 100.

The VoIP test apparatus 110 may alternatively or additionally determine the success of the VoIP test phone call by determining whether the VoIP test phone call is established with the called communication equipment within a threshold number of attempts to establish the call. For example, when a VoIP test phone call is not successfully established, the VoIP test apparatus 110 may reattempt to establish the call a predetermined number of times before determining that the VoIP test phone call has failed. The threshold number of attempts may be determined based on what time of day and/or day of week the VoIP test phone calls are generated.

The VoIP service provider 140 may generate a busy indication when, for example, the called communication equipment is in use or otherwise unavailable. The VoIP test apparatus 110 may determine that the VoIP test phone call has failed based on receiving the busy indication from the VoIP service provider 140. For example, the called communication equipment may be exclusively used for testing the VoIP communication system 100, and therefore it should always be available to receive a call from the VoIP test apparatus 110. Accordingly, receipt of a busy tone in response to a VoIP test phone call to such test communication equipment can indicate a communication failure for which corrective action may need to be taken.

When a VoIP test phone call is established through the VoIP service provider 140 with communication equipment at the called telephone number, the VoIP test apparatus 110 may also measure the quality of the established VoIP test phone call and determine the success of the phone call based on the measured quality of service. The VoIP test apparatus 110 may measure the quality of service of the phone call by measuring time delay in communications with the called communication equipment. For example, the VoIP test apparatus 110 may transmit a signal to the called communication equipment which is repeated back to the VoIP test apparatus 110. The delay between transmission and receipt of the signal can be measured to determine the communication delay. When the communication delay exceeds a threshold value, the VoIP test phone call may be determined to have insufficient quality of service and to have failed.

The VoIP test apparatus 110 may measure the quality of service of the phone call by measuring quality of communication signals from the called communication equipment. For example, the called communication equipment may transmit a known tone or symbol sequence, or may repeat back a tone/sequence received from the VoIP test apparatus 110. The VoIP test apparatus 110 may then compare the communication signals received from the called communication equipment to an expected or known signal (e.g., a quality of service measurement signal) to measure the quality of service of the call. A VoIP test phone call may be determined to have failed when insufficient quality of service is measured for the call.

The VoIP test apparatus 110 may select the called phone numbers so as to test various different portions of the VoIP communication system 100. For example, the VoIP test apparatus 110 may make VoIP test phone calls to the PSTN communication equipment 190 to test one communication pathway and make other VoIP test phone calls to the VoIP communication equipment 160 to test another communication pathway. Similarly, the VoIP test apparatus 110 may generate phone calls to different regional areas to test different portions of the VoIP communication system 100. The VoIP test apparatus 110 may also schedule the generation of the VoIP test phone calls at a periodic rate, or may schedule the calls based on the time of day and/or day of week to test the VoIP communication system 100 differently during peak versus low call loading times. The VoIP test phone calls may be scheduled based on the determined success of one or more previous VoIP test phone calls. For example, the VoIP test phone calls may be made more or less frequently based on whether prior phone calls appear to have failed.

The VoIP test apparatus 110 may generate a notice that can indicate that one or more calls have failed and that corrective action may need to be taken. The notice may be communicated to analysis/repair personnel via, for example, email, pager message, computer generated voice annunciated phone call, and/or wireless short message service. Depending on the severity of the failure recognized, local and/or remote alarm notices can be triggered. The notice may be generated based on the failure of one or more VoIP test phone calls, and/or a filter may be applied to the failures so that the notice is generated when a predetermined relationship is satisfied among the failed VoIP test phones calls and/or completed (non-failed) VoIP test phone calls. For example, completed calls may be counted with weighted values relative to failed calls, and the resulting counted values may be compared to a threshold value to determine when to generate a failure notice.

Although FIG. 1 illustrates an exemplary VoIP test apparatus 110, a VoIP communication system 100, a PSTN 180 and communication equipment, it will be understood that the present invention is not limited to such a configuration, but is intended instead to encompass any configuration capable of carrying out the operations described herein. For example, although only a single VoIP service provider 140, VoIP feature server 142, soft switch 144, and trunk gateway 170 have been shown for illustration purposes, it will be understood that the VoIP communication system 100 would generally route phone calls to/from thousands of VoIP subscribers through numerous servers, switches, and trunk gateways. Moreover, it is to be understood that the VoIP test apparatus 110 and/or the communication equipment 160 and 190 may communicate with a local access Internet provider and/or a VoIP service provider across a wireless interface such as, for example, a cellular interface (e.g., General Packet Radio System (GPRS), Enhanced Data Rates for Global Evolution (EDGE), Global System for Mobile Communications (GSM)), a wireless local area network interface (e.g., WLAN, IEEE 802.11), a Bluetooth interface, another RF communication interface, and/or an optical interface.

Figure 2:
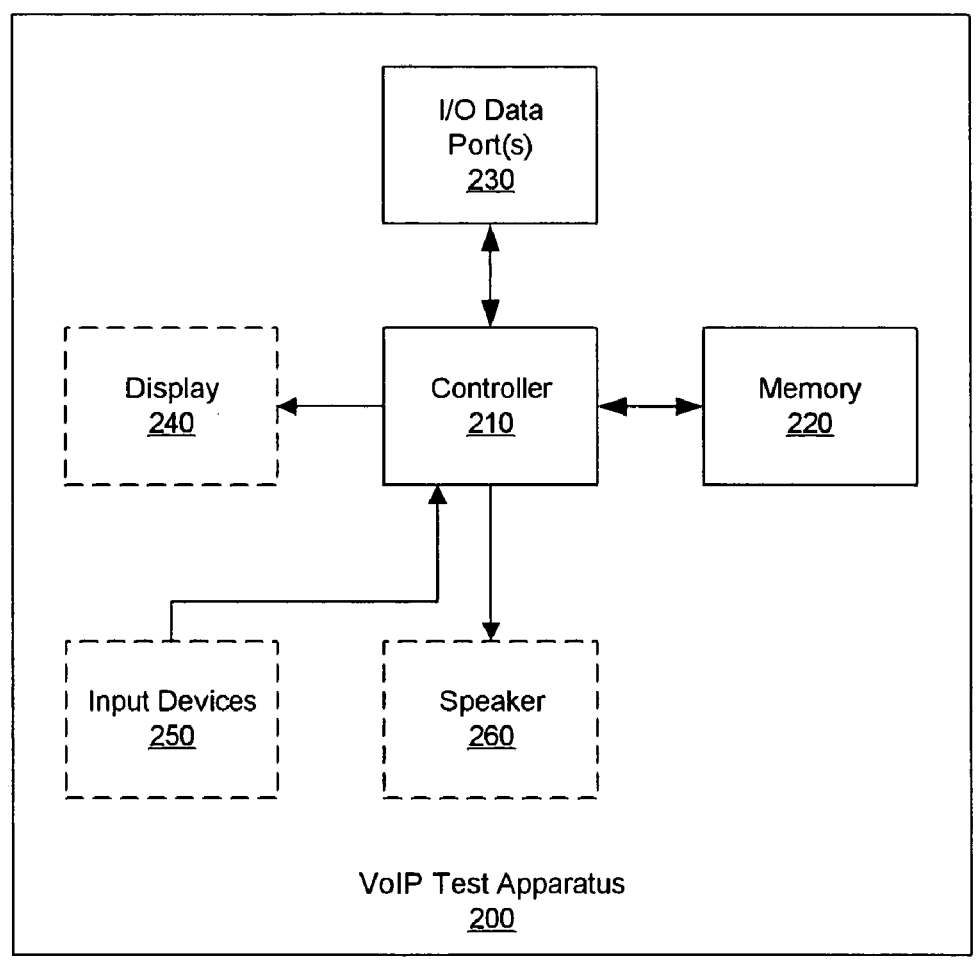
FIG. 2 is a block diagram of a VoIP test apparatus according to various embodiments of the present invention.

With reference now to FIG. 2, a VoIP test apparatus 200 is shown that may be suitable for use as the VoIP test apparatus 110 of FIG. 1 according to various embodiments of the present invention. The VoIP test apparatus 200 may include a controller 210 that communicates with a memory 220 and I/O data port(s) 230. The VoIP test apparatus 200 may optionally include (as illustrated by dashed lines) a display 240, input device(s) 250 such as a keyboard or keypad, and a speaker 260 that also communicate with the controller 210. The I/O data port 230 can be used to transfer information between the VoIP test apparatus 200 and the Internet, such as through a telephone modem, a cable modem, a DSL modem, a wireless network, and/or another device for communicating data with the Internet. These components may be conventional components such as those used in many conventional data processing systems which may be configured to operate as described herein.

The controller 210 can be any commercially available or custom microprocessor. The memory 220 is representative of the overall hierarchy of memory devices containing the software and data used to implement the functionality of the VoIP test apparatus 200. The memory 220 may include several categories of software and data used in the VoIP test apparatus 200: an operating system; application programs; input/output (I/O) device drivers; and data. The application programs are illustrative of the programs that implement the various features of the VoIP test apparatus 200 and include at least one application which supports operations according to embodiments of the present invention.

FIG. 3 is a flow chart illustrating operations for testing a VoIP communication system according to various embodiments of the present invention. At Block 300, a VoIP test phone call is generated. The success of the VoIP test phone call is determined at Block 310. At Block 320, further VoIP test phone calls are scheduled. Further embodiments of these operations are now described with reference to FIG. 4.

At Block 400, a VoIP test phone call is generated. At Block 410, a threshold time is determined, which may be based on the time of day and/or day of week in which the call is made. At Block 420, a decision is made as to whether the call has been established with a called communication device within the threshold time. When the decision at Block 420 is that the call was not established, then further attempts may be made to establish the call. At Block 430 an attempt threshold is determined, and at Block 440 a decision is made as to whether the call is established with the called communication device within the number of attempts defined by the attempt threshold. When the decision at Block 440 is that the call was not established within the number of allowed attempts, a test failure notice is generated at Block 450. As described above, the test failure notice may be generated based on a defined relationship between failed calls and/or completed calls, and the test failure notice may be communicated to analysis/repair personnel via, for example, email, pager message, computer generated voice annunciated phone call, and/or wireless short message service. Another VoIP test phone call is scheduled at Block 480. As described above, VoIP test phone calls may be scheduled at a periodic rate, based on the time of day and/or day of week, and/or based on the determined success of one or more previous VoIP test phone calls.

When the determination at Block 420 or Block 440 is that the call has been established, the Quality of Service of the call is measured at Block 460 and a determination is made at Block 470 as to whether the Quality of Service is within a defined threshold. When the Quality of Service is within the threshold, the call is determined to have completed successfully, and another call is scheduled at Block 480. When the Quality of Service is not within the threshold, the call is determined to have failed, and a test failure notice may be generated at Block 450.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of testing a Voice Over Internet Protocol (VoIP) communication system, the method comprising:
   generating a VoIP test phone call from a VoIP test apparatus through an Internet communication link to a VoIP service provider for a called telephone number including attempting to establish a VoIP test phone call through the VoIP service provider to the called telephone number; and
   determining success of the VoIP test phone call in the VoIP test apparatus including determining whether the VoIP test phone call is established with communication equipment at the called telephone number within a threshold time that is determined based on what time of day and/or day of week the VoIP test phone call is generated.

2. The method of claim 1, wherein generating a VoIP test phone call comprises communicating a VoIP test phone call through a local access Internet provider to the VoIP service provider.

3. A method of testing a Voice Over Internet Protocol (VoIP) communication system, the method comprising:
   generating a VoIP test phone call from a VoIP test apparatus through an Internet communication link to a VoIP service provider for a called telephone number including attempting to establish a VoIP test phone call through the VoIP service provider to the called telephone number; and
   determining success of the VoIP test phone call in the VoIP test apparatus including determining whether the VoIP test phone call is established with communication equipment at the called telephone number within a threshold number of attempts to establish the VoIP test phone call that is determined based on what time of day and/or day of week VoIP test phone calls are generated.

4. The method of claim 1, wherein:
   generating a VoIP test phone call comprises attempting to establish a VoIP test phone call through the VoIP service provider to the called telephone number; and
   determining success of the VoIP test phone call comprises determining whether a busy indication is received from the VoIP service provider.

5. The method of claim 1, wherein:
   generating a VoIP test phone call comprises establishing a VoIP test phone call through the VoIP service provider with communication equipment at the called telephone number; and
   determining success of the VoIP test phone call comprises measuring a quality of service in the established VoIP test phone call with the communication equipment.

6. The method of claim 5, wherein measuring a quality of service comprises measuring time delay in communication with the communication equipment.

7. The method of claim 5, wherein measuring a quality of service comprises measuring quality of communication signals from the communication equipment.

8. The method of claim 5, wherein measuring a quality of service comprises comparing a signal received from the communication equipment with a quality of service measurement signal.

9. The method of claim 1, wherein scheduling the generation of a VoIP test phone call comprises causing a VoIP test phone call to be generated at a periodic rate.

10. The method of claim 1, wherein scheduling the generation of a VoIP test phone call is based on the determined success of at least one previous VoIP test phone call.

11. The method of claim 1, further comprising scheduling the generation of a VoIP test phone call based on a time of day of the VoIP test phone call and/or a day of week of the VoIP test phone call.

12. The method of claim 1, further comprising generating a notice indicating a result of the determination of success of the VoIP test phone call.

13. A Voice Over Internet Protocol (VoIP) test apparatus comprising:
a controller that is configured to generate a VoIP test phone call through an Internet communication link to a VoIP service provider for a called telephone number, and is configured to determine success of the VoIP test phone call in response to whether the VoIP test phone call is established with communication equipment at the called telephone number within a threshold time that is determined based on what time of day and/or day of week the VoIP test phone call is generated.

14. The VoIP test apparatus of claim 13, wherein the controller is configured to schedule the generation of a VoIP test phone call.

15. The VoIP test apparatus of claim 14, wherein the controller is configured to generate VoIP test phone calls based on time of day, day of week, and/or determined success of at least one previous VoIP test phone call.

16. The VoIP test apparatus of claim 14, wherein the controller is configured to generate VoIP test phone calls at a periodic rate.

17. A Voice Over Internet Protocol (VoIP) test apparatus comprising:
a controller that is configured to generate a VoIP test phone call through an Internet communication link to a VoIP service provider for a called telephone number, and is configured to determine success of the VoIP test phone call based on whether the VoIP test phone call is established with communication equipment at the called telephone number within a threshold number of attempts to establish the VoIP test phone call that is determined based on what time of day and/or day of week VoIP test phone calls are generated.

18. The VoIP test apparatus of claim 13, wherein the controller is configured to determine success of the VoIP test phone call based on whether a busy indication is received from the VoIP communication system.

19. The VoIP test apparatus of claim 13, wherein the controller is configured to measure a quality of service in a VoIP test phone call established with communication equipment at the called telephone number, and is configured to determine success of the VoIP test phone call based on the measured quality of service.

20. The VoIP test apparatus of claim 19, wherein the controller is configured to measure time delay in communication with the communication equipment, and is configured to determine success of the VoIP test phone call based on the measured time delay.

21. The VoIP test apparatus of claim 19, wherein the controller is configured to measure quality of communication signals from the communication equipment, and is configured to determine success of the VoIP test phone call based on the measured quality.

22. The VoIP test apparatus of claim 19, wherein the controller is configured to compare a signal received from the communication equipment with a quality of service measurement signal, and is configured to determine success of the VoIP test phone call based on the comparison.

23. A computer program product for testing a Voice Over Internet Protocol (VoIP) communication system, the computer program product comprising program code embodied in a computer-readable storage medium, the computer program code comprising:
program code that is configured to generate a VoIP test phone call through an Internet communication link to a VoIP service provider for a called telephone number, and is configured to determine success of the VoIP test phone call by determining whether the VoIP test phone call is established with communication equipment at the called telephone number within a threshold time that is determined based on what time of day and/or day of week the VoIP test phone call is generated.

* * * * *